United States Patent [19]
Willox

[11] 3,740,455
[45] June 19, 1973

[54] TAMPER-RESISTANT GUARD DUCT FOR ELECTRIC POLE RISER CABLES

[76] Inventor: J. Hebden Willox, 917 Newcastle Avenue, Westchester, Ill. 60153

[22] Filed: Mar. 29, 1972

[21] Appl. No.: 239,039

[52] U.S. Cl. .................... 174/101, 174/45 R
[51] Int. Cl. .................... H02g 3/04, H02g 7/20
[58] Field of Search .................... 174/5 R, 38, 45 R, 174/68 R, 68 C, 70 C, 72 C, 95, 97, 101, 135

[56] References Cited

UNITED STATES PATENTS

| | | | |
|---|---|---|---|
| 1,923,825 | 8/1933 | Herz | 174/45 R |
| 2,885,460 | 5/1959 | Borresen et al. | 174/97 X |
| 3,435,124 | 3/1969 | Channell | 174/38 |
| 3,454,706 | 7/1969 | Willox | 174/45 R |
| 3,580,982 | 5/1971 | Havewala | 174/45 R |

FOREIGN PATENTS OR APPLICATIONS

| | | | |
|---|---|---|---|
| 977,878 | 11/1950 | France | 174/97 |
| 1,568,833 | 4/1969 | France | 174/70 C |
| 884,834 | 7/1953 | Germany | 174/97 |

*Primary Examiner*—Laramie E. Askin
*Attorney*—Ralph R. Pittman

[57] ABSTRACT

A guard duct for enclosing the insulated riser cable used for connecting underground cables to pole-supported overhead conductors has (1) an outer guard member adapted for attachment to an upstanding pole, the outer guard member having a generally trough-shaped cable-receiving passageway extending linearly therealong and (2) an inner coextensive backplate member transversely spanning the cable-receiving passageway, the backplate member having a pair of hook-shaped integral projections extending linearly along the inner surface of the trough-shaped passageway and constituting an interior barrier effective to obstruct the entrance to the cable passageway of foreign objects inserted into the duct from the outside.

1 Claim, 3 Drawing Figures

14 27 11 21 20 23 18 19 23 24 24 25 15 17 12 10 16 16

PATENTED JUN 19 1973 3,740,455

TAMPER-RESISTANT GUARD DUCT FOR ELECTRIC POLE RISER CABLES

BACKGROUND

This invention relates to guard ducts utilized for enclosing insulated riser cables as they are extended upwardly along a wood pole in order to electrically connect underground cables to overhead conductors, and particularly to a guard duct construction effective to obstruct access to the cable passageway from points outside the duct run.

It has long been common practice to cover the pole riser with some sort of guard structure as a protection against mechanical damage. With increasing distribution voltages, the shock hazard to workmen has correspondingly increased, and guard ducts currently are preferably formed from some weather-resistant insulating material.

A much-used configuration of guard duct is U-shaped or V-shaped in section, and to assure satisfactory impact resistance the material forming the duct has relatively high strength and ample wall thickness is provided. Attachment of the duct run to the pole is commonly effected by fasteners extending into the pole at intervals along marginal flanges integral with the trough-shaped cable-receiving portion of the duct.

The most widely used insulation for riser cables is a crosslinked polyethylene, and this material is adversely affected by contact with creosote oil or pentachlorophenol, the latter materials being commonly used wood pole preservatives. For this reason, it is desirable to provide a liner or shield member along the duct, isolating the cable from the preservative-injected pole.

The inherent rigidity of the mechanical protective guard duct member makes its conformance to an irregular or uneven pole surface difficult, if not impossible, and since a substantial part of the duct run is readily accessible to the public, the high voltage cable within the duct may be contacted by wires or other slender conducting objects inserted between the duct and the pole or between the duct liner and the duct.

PRIOR ART

A large variety of enclosures have been heretofore utilized for containing pole riser cables, the recessed-molding or trough-shaped configuration having almost completely replaced pipe type conduit because of its relative ease of installation and lower cost.

There appears no suggestion in the prior art of any molding type of duct in which is embodied any hook-shaped barrier means effective to obstruct the intrusion of foreign objects into the duct for possible contact with the contained electrically energized cable.

SUMMARY OF THE INVENTION

A well-known trough-shaped outer guard duct member is joined along its length with an inner backplate closure member, the backplate being constructed to cooperate with the outer duct member to provide barriers effectively precluding contact with an enclosed cable by any objects pushed into the duct run from the outside.

In accordance with the preferred construction, the outer trough-shaped cable receiving member, because of the impact strength requirement, has a wall of substantial thickness, and is formed from some relatively high strength insulating material as, for example, a copolymer of acrylonitrile, butadiene and styrene (ABS). The backplate member is preferably formed from an insulating plastic composition having a high resistance to degradation by wood preserving materials as, for example, a polyvinyl chloride based material (PVC). In addition, the backplate has a relatively thin wall, so that it is sufficiently flexible to bend along and confrom to the surfaces of wood poles which vary in diameter and surface contour.

An object of the present invention is to provide a riser guard duct which includes a pair of linearly extending, hook-shaped barriers disposed inside the duct, the barriers effectively barring intrusion into the cable passageway of objects inserted into the duct from the outside. Another object is the provision of a trough-shaped duct having a backplate closure member along the opening of the trough-shaped member, the backplate member including integrally formed, linearly extending hook-shaped barriers projecting forwardly therefrom in registration with the interior of the associated outer trough-shaped member.

A further object is the provision of a fastening structure for securing the guard duct run upwardly along a pole, such that the fastening will not be destroyed or loosened by the linear expansion and contraction of the duct under varying ambient temperature conditions. Other objects and advantages will be apparent from the specification and claims, and from the accompanying drawings.

DESCRIPTION OF THE PREFERRED EMBODIMENT

Figure 1:
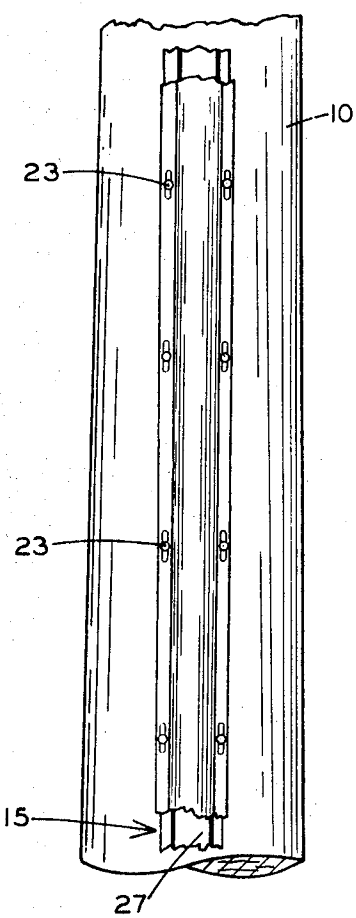
FIG. 1 is an elevational view of a portion of a supporting pole showing the attached guard duct.

As shown in FIG. 1, the guard duct extending upwardly along the wood pole 10 includes an outer, forwardly extending trough-shaped member 11, along which is fitted the inner backplate closure member 15, these members being secured to the pole by the lag-screw fasteners 23, in association with the washers 24 and 25 to form the enclosed cable passageway generally indicated at the numeral 27.

Figure 2:
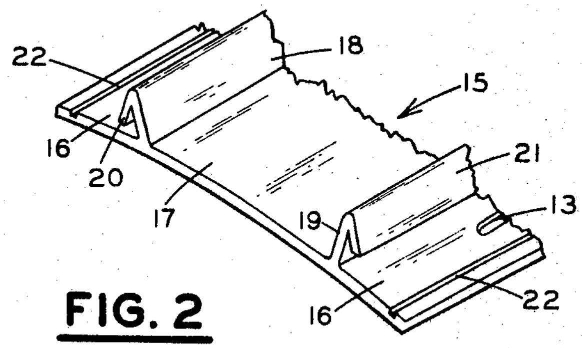
FIG. 2 is a fragmentary isometric view of the backplate member, showing the disposition of the integral hook-shaped barriers.
Figure 3:
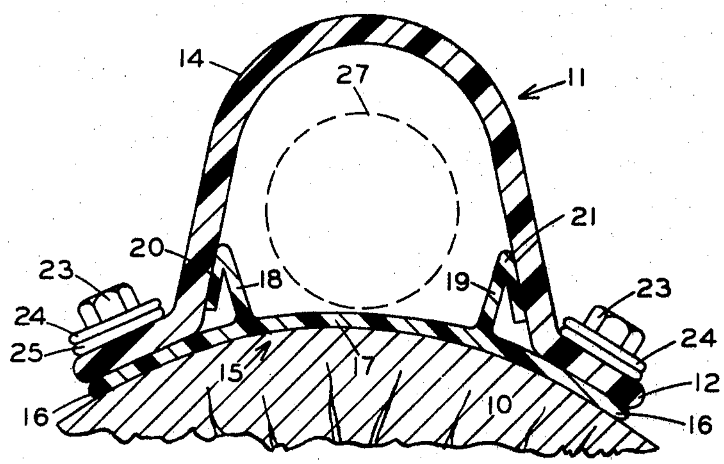
FIG. 3 is an enlarged sectional view of the guard duct.

The construction of the guard duct is shown in more detail in FIGS. 2 and 3. The outer impact-resistant member 11 has a forwardly projecting trough-shaped portion 14, within which the cable passageway 27 longitudinally extends, and the integral marginal flanges merging with the respective sides of the trough portion.

To avoid electrical shock hazard to persons standing on the ground or to linemen in a climbing space near a grounded conductor, the outer member 11 is preferably formed from a plastic having suitable insulating properties, and to protect the cable passageway from encroachment by an impact, as by a moving vehicle, it is essential that the outer member 11 be constructed of a rugged material with ample wall thickness. One plastic material meeting these requirements is the ABS previously mentioned.

An outer member so constructed will expand and contract appreciably under ambient temperature conditions, and absent some compensating provision, may loosen or withdraw the fasteners used to attach the guard duct to the pole. To compensate for temperature induced movement, the marginal flanges 12 are provided with the longitudinally extending slotted openings or apertures 13, so that the outer member may move up or down without misaligning the associated fastener.

Since many cable insulations are susceptible to damage from contact with wood pole preservatives leaching out of a pole, it is important to dispose a shielding member, composed of a material resistant to degradation by such preservatives, between the cable passageway and the pole. The PVC based material previously referred to is one suitable plastic.

The central pole-engaging portion 17 of the inner backplate member 15 functions as such a contact shielding member, being maintained in its position as a rear closure member of the guard duct by the linear engagement of the outwardly extending flanged portions 16 with the complementary flanges 12 of the outer member 11 and transversely spanning the cable-receiving passageway. Since it is desirable that the backplate conform to poles varying both in diameter and surface uniformity, the pole engaging portion of the backplate has a flexible wall substantially less in thickness than the wall of the rigid outer member 11.

As shown somewhat more clearly in FIG. 2, the backplate member 15 includes a pair of integral coextensive barriers extending forwardly into the hollow of the trough-shaped passageway, the barriers being hook-shaped in section, as is also shown in FIG. 3. One of the barriers has a first portion 18 extending forwardly from a line adjacent to and inwardly spaced from the inner margin of one of the marginal flanges and a second portion 20 extending rearwardly from the forward margin of the first portion and along and adjacent to a linear coextensive portion of the inner surface of the trough-shaped passageway. In similar fashion, the respective forwardly and rearwardly extending portions 19 and 21 of the other barrier are disposed along the other side of the trough-shaped passageway.

When attaching the guard duct to an upstanding pole, it is convenient to first tack the backplate in its desired final position. To prevent the tacking nails or tacks from interfering with the driving of the lag screws through the registering oval fastener slots 13, a small but visually perceptible nail guide groove 22 is formed along the forward faces of the backplate marginal flanges 16, positioned outwardly to avoid coincidence with the fastener slots 13.

At locations where the guard duct passes over depressions along nonuniform pole surfaces, a wire or some narrow object may be inserted between the coextensive flanges of the inner and outer members of the guard duct. Should this occur, the extent of entrance is limited by contact with the inner surface of one of the hook-shaped barriers, thus effectively obstructing access to the cable passageway.

What is claimed is:

1. A tamper-resistant guard duct comprising an elongate outer member and a coextensive inner backplate member, said outer member having a generally trough-shaped portion defining a cable-receiving passageway extending linearly therethrough, a first pair of integral outstanding marginal flanges located along the respective sides of said trough-shaped portion and said backplate member having a second pair of outstanding flanges coextensively engaging said first pair of flanges, said backplate member transversely spanning said trough-shaped portion and enclosing said passageway, a pair of coextensive hook-shaped barriers extending into said passageway from said backplate, each barrier having a first wall extending forwardly from a line laterally spaced from the inner margin of one of said second pair of marginal flanges and a second wall extending rearwardly from the forward margin of said first wall, said second wall interfacially abutting the coextensive inner surface of said trough-shaped portion, the walls being divergently directed and defining a cavity disposed alongside the juncture of said outer member and said backplate member, said cavity being bounded entirely by said backplate in association with said outer member.

* * * * *